(12) United States Patent
Lee

(10) Patent No.: US 11,583,040 B1
(45) Date of Patent: Feb. 21, 2023

(54) EASY RELEASE BACKBOARD STRAP CLIP

(71) Applicant: Michael R. Lee, Medicine Hat (CA)

(72) Inventor: Michael R. Lee, Medicine Hat (CA)

( * ) Notice: Subject to any disclaimer, the term of this patent is extended or adjusted under 35 U.S.C. 154(b) by 0 days.

(21) Appl. No.: 17/533,529

(22) Filed: Nov. 23, 2021

Related U.S. Application Data

(63) Continuation-in-part of application No. 17/166,296, filed on Feb. 3, 2021, now Pat. No. 11,207,228.

(51) Int. Cl.
*A44B 11/28* (2006.01)
*A61G 1/044* (2006.01)

(52) U.S. Cl.
CPC .............. *A44B 11/28* (2013.01); *A61G 1/044* (2013.01); *A61G 2200/327* (2013.01)

(58) Field of Classification Search
CPC .......... A61G 1/044; A44B 11/28; F16B 2/10; Y10T 24/44385; Y10T 24/4745; Y10T 24/3428; Y10T 24/4773
See application file for complete search history.

(56) References Cited

U.S. PATENT DOCUMENTS

| | | | |
|---|---|---|---|
| 4,369,982 A * | 1/1983 | Hein | A61G 1/0225 5/628 |
| 4,519,106 A * | 5/1985 | Sandquist | A61G 1/044 5/652 |
| 4,970,738 A | 11/1990 | Cole | |
| 5,414,883 A | 5/1995 | Fangrow, Jr. | |
| 5,435,323 A * | 7/1995 | Rudy | A61F 5/05883 5/628 |
| 5,492,285 A | 2/1996 | Hamrick | |
| 6,055,988 A | 5/2000 | Perisho | |
| 6,435,188 B2 * | 8/2002 | Tyrrell | A61G 1/044 5/624 |
| 7,168,110 B2 | 1/2007 | Girard et al. | |
| 8,851,079 B1 | 10/2014 | Schenck | |
| 10,406,042 B2 * | 9/2019 | Boak | A61G 1/048 |
| 2005/0241068 A1 * | 11/2005 | Tomcany | A61G 1/04 5/628 |
| 2006/0231106 A1 | 10/2006 | Ostrowski | |
| 2010/0170036 A1 | 7/2010 | Shirandami | |

* cited by examiner

*Primary Examiner* — Robert Sandy
(74) *Attorney, Agent, or Firm* — Cramer Patent & Design, PLLC; Aaron R. Cramer

(57) ABSTRACT

An Easy Release Backboard Strap Clip is a stab lock type of clip mounted to a swivel. The clip may be squeezed to open the pads of the clip. The clip is utilized in a backboard in conjunction with backboard straps to retain, secure and restrain a patient being transferred into and out of an emergency medical vehicle. The clip provides an easy means of opening and closing the clip.

18 Claims, 4 Drawing Sheets

EASY RELEASE BACKBOARD STRAP CLIP

RELATED APPLICATIONS

The present invention is a continuation-in-part of U.S. application Ser. No. 17/166,296 filed on Feb. 3, 2021, the entire disclosures of which are incorporated herein by reference.

FIELD OF THE INVENTION

The present invention relates generally to a strap clip and more specifically to a strap clip for a backboard that is easy to release.

BACKGROUND OF THE INVENTION

A backboard is frequently used to transport emergency medical patients. Not only does it make lifting and moving the patient easier, but it helps to stabilize their muscular skeletal system to prevent possibly further injury. An integral part of these backboards is the straps that hold the patient in place. These straps are attached to the board by "swivel speed clips" latched to pins in the handholds. The straps then crisscross the patient and buckle together in front of the patient.

While the buckles and speed clips are easy for emergency personnel to attach, and the front buckles are no problem for medical personnel in the hospital, the "speed clips" are extremely difficult to remove under the best of situations. These clips must be removed in order to slide the backboard out from under the patient. To complicate matters further, such clips are not accessible and often covered with blood and other bodily fluids. Accordingly, there exists a need for a means by which speed clips on backboard straps can be more easily removed in order to address the issues as described above. The development of the easy release backboard strap clip fulfills this need.

SUMMARY OF THE INVENTION

In view of the foregoing references, the inventor recognized the aforementioned inherent problems and observed that there is a need for a quick-release backboard strap clip has a main loop which has a first clip half and a second clip half, a handle section which forces a pair of handle paddles together along a handle squeeze path, a pivot point which pivots the first clip half and the second clip half, a spring which holds the first clip half and the second clip half together, a sliding guide which is held within the main loop which provides physical protection for the spring as well as structural stability of the main loop, a vertically protruding swivel joint which include an upper portion of the first clip half, and a retainment area which fastens around a rod in an attachment opening of a backboard. The quick-release backboard strap clip provides for the quick and easy release of an individual buckle and strap system from the backboard used for transporting a patient.

The second clip half may open up from the first clip half at an opening along an opening travel path. The quick-release backboard strap may clip on each of a plurality of straps allow the backboard to be pulled out from underneath the patient. The straps may be made of nylon. An upper portion of the first clip half may provide for the vertically protruding swivel joint. The pair of handle paddles may be provided with a plurality of ridges to aid in gripping stability. The first clip half and the second clip half may include a lapped joint to allow for movement along a handle squeeze path.

The first clip half and the second clip half may be mechanically coupled by the pivot point. The pivot point may be selected from the group consisting of a pin, a rivet, or a screw. The spring may be the first clip half and the second clip half together in a static position or a closed position. The sliding guide may include an outer guide which may be attached to the first clip half and an inner guide attached to the second clip half.

The main loop in use with the sliding guide may provide for an extension arm for attachment to one or more structurally static objects. A distal side of the swivel joint may mechanically connect to an extension arm allowing for clearance of the pair of handle paddles when manipulated along the handle squeeze path.

The distal side of the swivel joint may mechanically connect to the extension arm allowing for clearance of the handle paddles when manipulated along the handle squeeze path. The distal side of the extension arm may be provided with a strap attachment loop. The strap attachment loop and the extension arm may not interfere with the operation of the handle paddles regardless of the orientation of the strap attachment loop. The swivel joint may allow for a continuous 360-degree travel path to ensure non-binding fit and comfort for the patient. The rod may be contained within the plane of the attachment opening so the backboard is slid underneath the patient. The retainment area of the clip may encompass the rod during use and tension.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
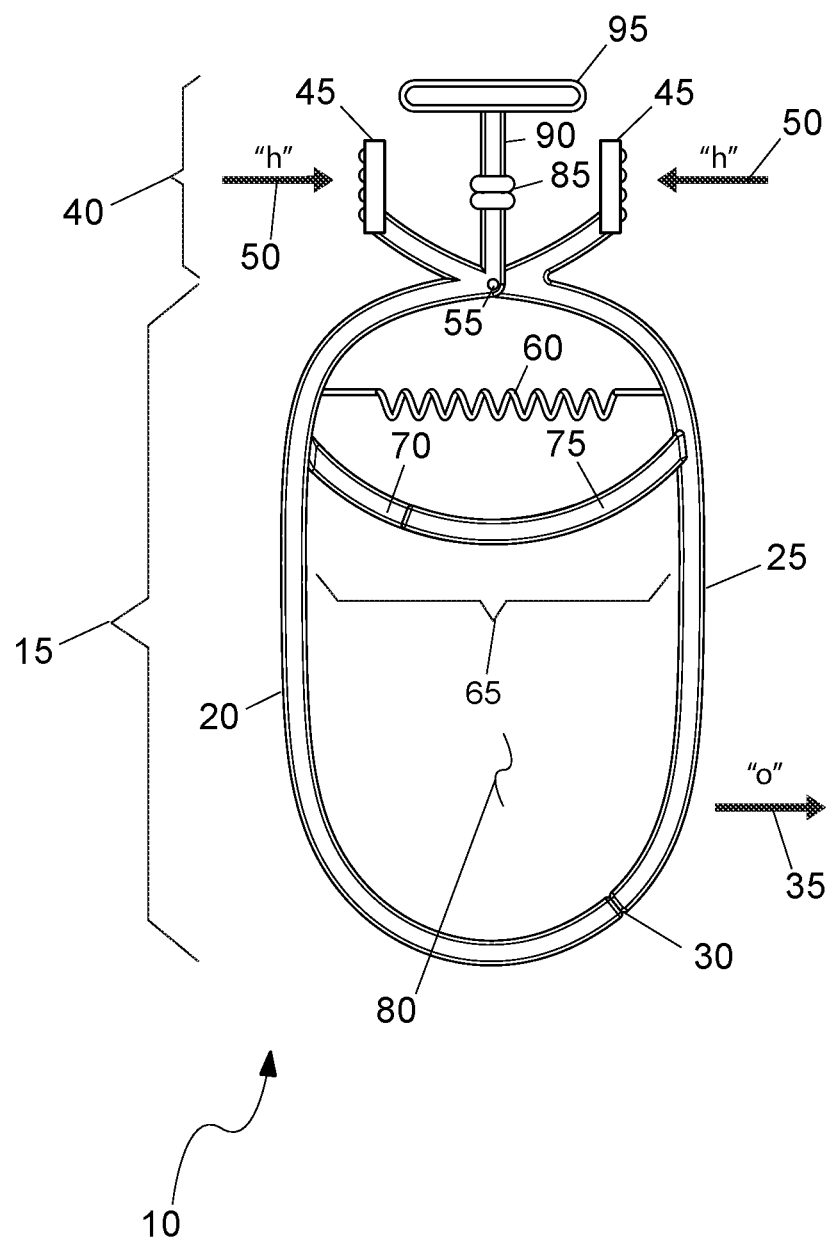
FIG. 1 is a front view of the quick-release backboard strap clip, according to the preferred embodiment of the present invention.

DESCRIPTIVE KEY 10 quick-release backboard strap clip
15 main loop
20 first clip half
25 second clip half
30 opening
35 opening travel path "o"
40 handle section
45 handle paddle
50 handle squeeze path "h"
55 pivot point
60 spring
65 sliding guide 70 first guide portion
75 second guide portion
80 retainment area
85 swivel joint
90 extension arm
95 strap attachment loop
100 lapped joint
105 ridge
110 continuous travel path "s"
115 backboard
120 patient
125 strap
130 rod
135 attachment opening
140 rod release path "r"
145 clip removal path "c"

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the quick-release backboard strap clip 10, according to the preferred embodiment of the present invention is disclosed. The quick-release backboard strap clip 10 (herein also described as the "clip") 10, provides for the quick and easy release of an individual buckle and strap 125 system from a backboard 115 used for transporting a patient 120. The utilization of the clips 10 on multiple straps 125 allow the backboard 115 to be effortlessly pulled out from underneath the patient 120.

The clip 10 includes predominantly of a main loop 15 comprising a first clip half 20 and a second clip half 25. The second clip half 25 opens up from the first clip half 20 at an opening 30 along an opening travel path "o" 35. The motion of the opening travel path "o" 35 is initiated by a handle section 40 in which two (2) handle paddles 45 are forced together along a handle squeeze path "h" 50, in much the same manner as a pair of pliers. The first clip half 20 and the second clip half 25 pivot at a pivot point 55. Under static or closed position, the first clip half 20 and the second clip half 25 are held together by a spring 60. The force exerted along the handle squeeze path "h" 50 is envisioned to easily overcome the tension of the spring 60 when opening the main loop 15. Physical protection for the spring 60 as well as structural stability of the main loop 15 is provided by a sliding guide 65 within the main loop 15. The sliding guide 65 comprises a first guide portion 70 attached to the first clip half 20 and a second guide portion 75 attached to the second clip half 25. This configuration of the main loop 15 in use with the sliding guide 65 provides for an extension arm 90 for attachment to various structurally suitable static objects as will be described in greater detail herein below.

The upper portion of the first clip half 20 provides for a vertically protruding swivel joint 85. The distal side of the swivel joint 85 mechanically connects to an extension arm 90 allowing for clearance of the handle paddles 45 when manipulated along the handle squeeze path "h" 50. The distal side of the extension arm 90 is provided with a strap attachment loop 95. It is envisioned that the clip 10 would be constructed of various steel allows for strength and would be made in various sizes to suit specific needs. However, the exact materials of construction as well as specific dimensions of the clip 10 are not intended to be a limiting factor of the present invention.

Figure 2:
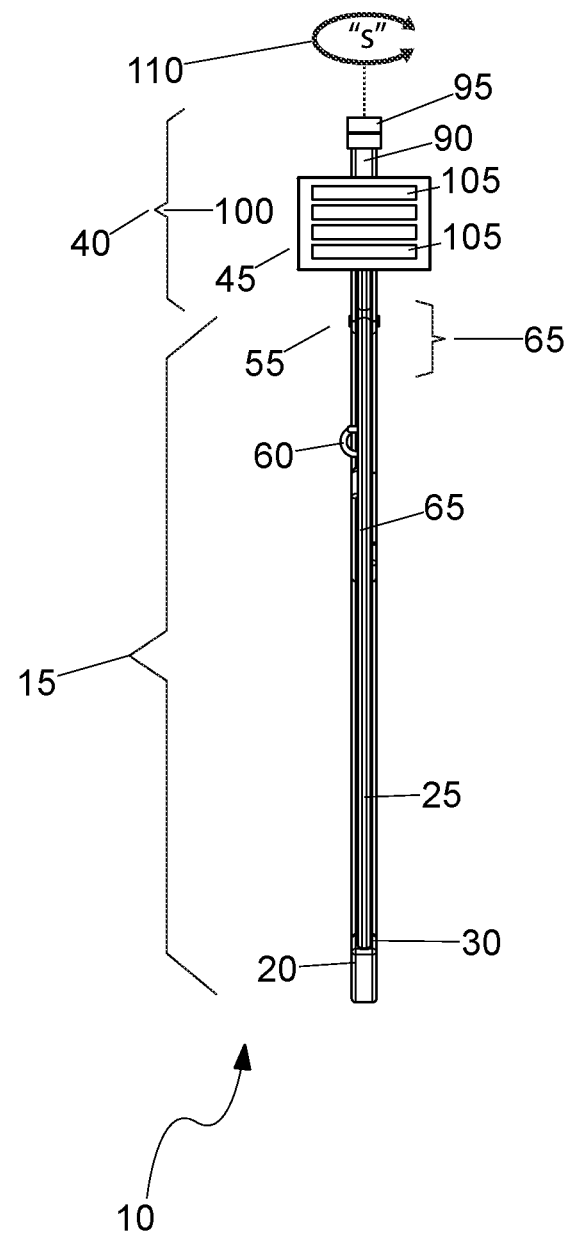
FIG. 2 is a side view of the quick-release backboard strap clip, according to the preferred embodiment of the present invention.

Referring next to FIG. 2, a side view of the clip 10, according to the preferred embodiment of the present invention is depicted. This view provides further information on the slim profile of the main loop 15 and the handle section 40, thus allowing the clip 10 to enter narrow openings. The first clip half 20 and the second clip half 25 are mechanically coupled by the pivot point 55 such as a pin, rivet, screw, or the like in a rotating manner. The sliding guide 65 provides stability by nature of the first guide portion 70 and second guide portion 75 arranged in a "stacked" position. The first clip half 20 and the second clip half 25 are envisioned to comprise a lapped joint 100 to allow for movement along the handle squeeze path "h" 50 (as shown in FIG. 1). The handle paddles 45 (of which only one (1) is shown in FIG. 2 due to illustrative limitations) is provided with multiple ridges 105 to aid in gripping stability. Such stability is viewed as valuable when attempting to apply or remove the clip 10 in emergency situations where the handle paddles 45 may be covered with bodily fluids such as blood. The strap attachment loop 95 and the extension arm 90 do not interfere with the operation of the handle paddles 45 regardless of the orientation of the strap attachment loop 95. The swivel joint 85 (as shown in FIG. 1) allows for a continuous three hundred sixty degree (360°) travel path "s" 110 to ensure non-binding fit and comfort for the patient 120.

Figure 3:
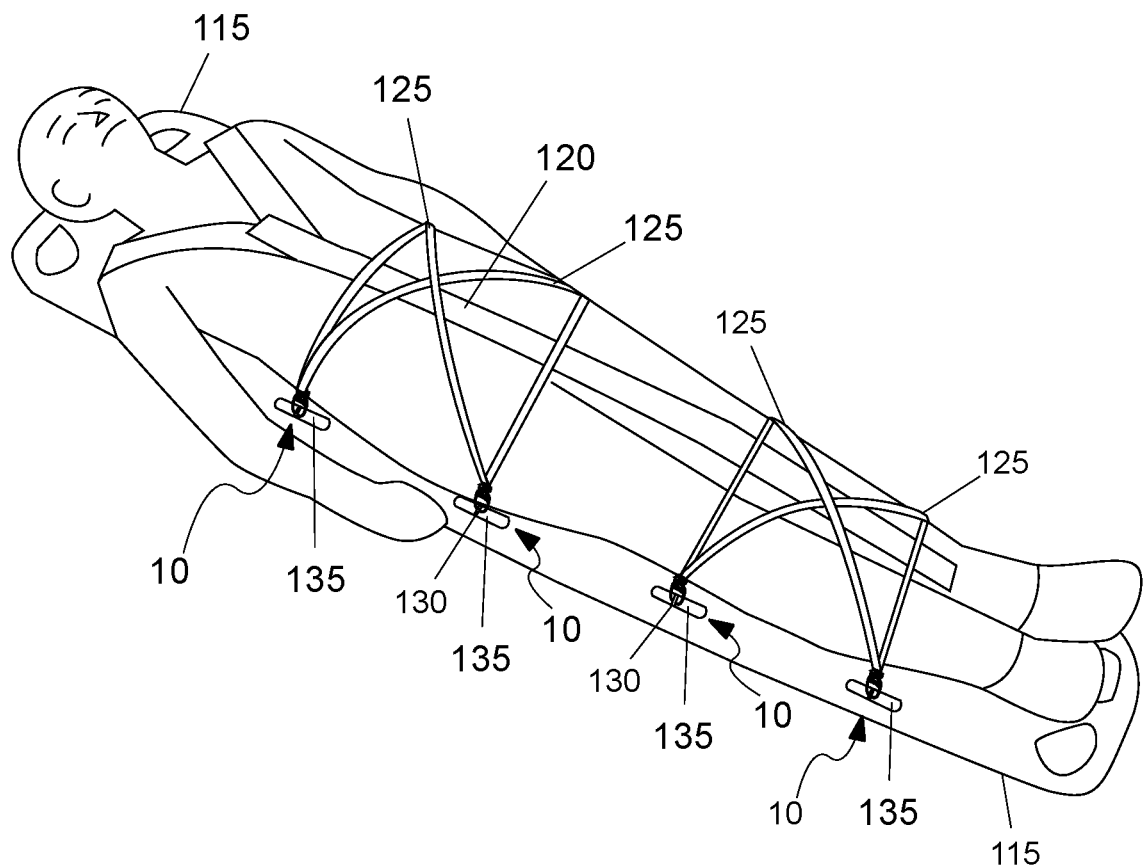
FIG. 3 is a perspective view of multiple quick-release backboard strap clips, shown in an installed state on a backboard, according to the preferred embodiment of the present invention; and, FIG. 4 is a detailed perspective view of a single quick-release backboard strap clip, shown in an installed state on a backboard, according to the preferred embodiment of the present invention.

Referring now to FIG. 3, is a perspective view of multiple clips 10, shown in an installed state on a backboard 115, according to the preferred embodiment of the present invention is shown. A patient 120 is secured to the backboard 115 by a set of straps 125, envisioned to be made of nylon or other similar strong material. One (1) or both ends of the straps 125 are equipped with the clip 10, which are fastened through the strap attachment loop 95 (as shown in FIG. 1) and fastened upon itself via a conventional manner such as sewing, riveting, adhesive or the like. The retainment area 80 (as shown in FIG. 1) is fastened around a rod 130 in an attachment opening 135.

Figure 4:
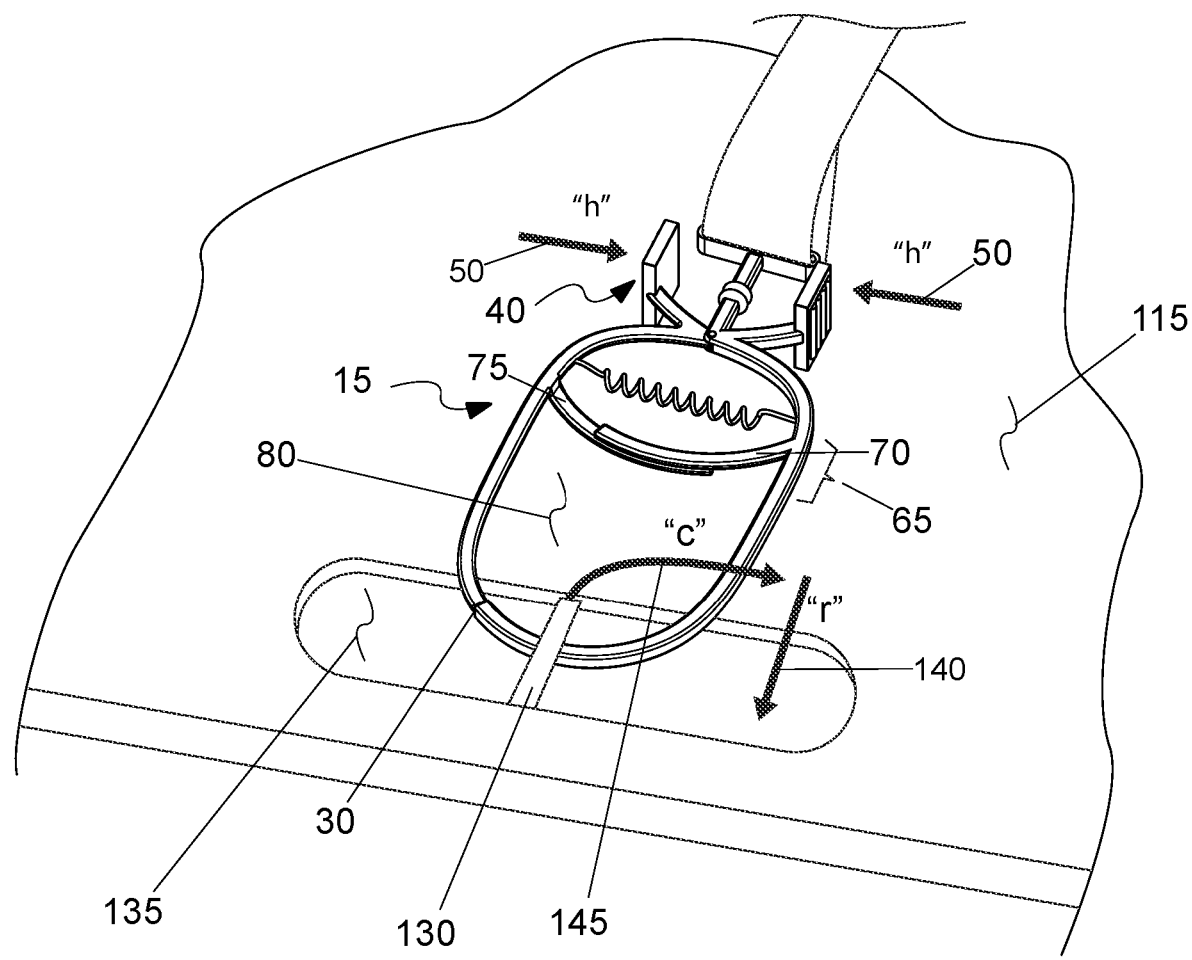

Referring to FIG. 4, a detailed perspective view of a single clip 10, shown in an installed state on a backboard 115, according to the preferred embodiment of the present invention is disclosed. This view provides additional clarification on the captive nature of the clip 10. The rod 130 is contained within the plane of the attachment opening 135 so the backboard 115 can be easily slid underneath the patient 120 (as shown in FIG. 3). The retainment area 80 of the clip 10 encompasses the rod 130 during use and tension. The disengagement (release) of the clip 10 occurs in a quick manner by simultaneous application of finger pressure along the handle squeeze path "h" 50 while moving the clip 10 downward along a rod release path "r" 140. The movement along the rod release path "r" 140 allows the rod 130 to be disengaged from the lower portion of the first clip half 20. At this point in time, the rod 130 is passed out of the opening 30 (as shown in FIG. 1) along a clip removal path "c" 145. Re-application of the clip 10 follows the reverse of this path. These features enable a user to quickly and accurately disengage the clip 10, especially in wet, dirty, or less than ideal visual situations.

2. Operation of the Preferred Embodiment

The preferred embodiment of the present invention can be utilized by the common user in a simple and effortless manner with little or no training. It is envisioned that the clip 10 would be constructed in general accordance with FIG. 1 through FIG. 4. The user would procure the clip 10 from conventional procurement channels such as medical supply houses, mail order and internet supply houses and the like. Special attention would be paid to the overall size of the clip 10, size of the strap attachment loop 95 to accommodate the straps 125 to be used, materials of construction, and the like.

After procurement and prior to utilization, the clip 10 would be prepared in the following manner: the straps 125 would be inserted through the strap attachment loop 95 and attached back to itself via sewing, rivets, adhesive or the like. At this point in time, the clip 10 is ready for utilization.

During application of the clip 10, the user would grasp the clip 10 and squeeze the two (2) handle paddles 45 along the handle squeeze path "h" 50 thereby resulting in the second clip half 25 separating from the first clip half 20 at the opening 30; the opening 30 is then placed over the rod 130 on the attachment opening 135 on the backboard 115. The straps 125 are then secured around the patient 120 in the conventional manner.

Removal or disengagement of the clip 10 occurs in the following manner: the user applies pressure along the handle squeeze path "h" 50 while moving the clip 10 downward along the rod release path "r" 140, the movement being directed along the rod release path "r" 140 allows the rod 130 to be disengaged from the lower portion of the first clip half 20, the rod 130 is passed out of the opening 30 along the clip removal path "c" 145. At this point in time, the backboard 115 may be slid out from under the patient 120 without hinderance from the straps 125 or the clip 10. The clip 10 can be applied and removed repeatedly on the backboard 115 in a continuous and cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A quick-release backboard strap clip, comprising:
a main loop having a first clip half and a second clip half;
a handle section forcing a pair of handle paddles together along a handle squeeze path;
a pivot point pivoting the first clip half and the second clip half;
a spring holding the first clip half and the second clip half together;
a sliding guide held within the main loop providing physical protection for the spring as well as structural stability of the main loop;
a vertically protruding swivel joint including an upper portion of the first clip half; and
a retainment area fastened around a rod in an attachment opening of a backboard;
wherein the quick-release backboard strap clip provides for the quick and easy release of an individual buckle and strap system from the backboard used for transporting a patient; and,
wherein a length of the first clip half is longer than a length of the second clip half.

2. The quick-release backboard strap clip, according to claim 1, wherein the second clip half opens up from the first clip half at an opening along an opening travel path.

3. The quick-release backboard strap clip, according to claim 1, wherein a plurality of quick-release backboard strap clips on each of a plurality of straps allow the backboard to be pulled out from underneath the patient.

4. The quick-release backboard strap clip, according to claim 3, wherein the plurality of straps are made of nylon.

5. The quick-release backboard strap clip, according to claim 1, wherein the pair of handle paddles is provided with a plurality of ridges to aid in gripping stability.

6. The quick-release backboard strap clip, according to claim 1, wherein the first clip half and the second clip half include a lapped joint to allow for movement along a handle squeeze path.

7. The quick-release backboard strap clip, according to claim 1, wherein the first clip half and the second clip half are mechanically coupled by the pivot point.

8. The quick-release backboard strap clip, according to claim 1, wherein the pivot point is selected from the group consisting of a pin, a rivet, or a screw.

9. The quick-release backboard strap clip, according to claim 1, wherein the spring holds the first clip half and the second clip half together in a static position or a closed position.

10. The quick-release backboard strap clip, according to claim 1, wherein the sliding guide includes an outer guide attached to the first clip half and an inner guide attached to the second clip half.

11. The quick-release backboard strap clip, according to claim 1, wherein the main loop in use with the sliding guide provides for an extension arm for attachment to one or more structurally static objects.

12. The quick-release backboard strap clip, according to claim 1, wherein a distal side of the swivel joint mechanically connects to an extension arm allowing for clearance of the pair of handle paddles when manipulated along a handle squeeze path.

13. The quick-release backboard strap clip, according to claim 12, wherein the distal side of the swivel joint mechanically connects to the extension arm allowing for clearance of the handle paddles when manipulated along the handle squeeze path.

14. The quick-release backboard strap clip, according to claim 1, wherein a distal side of an extension arm is provided with a strap attachment loop.

15. The quick-release backboard strap clip, according to claim 14, wherein the strap attachment loop and the extension arm do not interfere with the operation of the handle paddles regardless of the orientation of the strap attachment loop.

16. The quick-release backboard strap clip, according to claim 1, wherein the swivel joint allows for a continuous 360-degree travel path to ensure non-binding fit and comfort for the patient.

17. The quick-release backboard strap clip, according to claim 1, wherein the rod is contained within the plane of the attachment opening so the backboard is slid underneath the patient.

18. The quick-release backboard strap clip, according to claim 1, wherein the retainment area of the clip encompasses the rod during use and tension.

\* \* \* \* \*